US006848873B1

(12) United States Patent
Husk

(10) Patent No.: US 6,848,873 B1
(45) Date of Patent: Feb. 1, 2005

(54) TIE DOWN BAR

(76) Inventor: Vernon R Husk, 1425 Dike Rd., Mount Vernon, WA (US) 98273

( * ) Notice: Subject to any disclaimer, the term of this patent is extended or adjusted under 35 U.S.C. 154(b) by 0 days.

(21) Appl. No.: 10/743,889

(22) Filed: Dec. 22, 2003

Related U.S. Application Data

(60) Provisional application No. 60/444,160, filed on Feb. 3, 2003.

(51) Int. Cl.[7] .............................................. B61D 45/00
(52) U.S. Cl. ...................................... 410/115; 410/106
(58) Field of Search ............................. 410/66, 77, 78, 410/85, 94, 95, 101, 102, 106, 108, 110, 115; 248/499, 500, 503, 231.51, 231.61; 224/402, 403

(56) References Cited

U.S. PATENT DOCUMENTS

| 3,367,286 A | * | 2/1968 | Jantzen .................... 410/102 |
| 3,785,517 A | | 1/1974 | Braikovich |
| 3,912,139 A | | 10/1975 | Bowman |
| 3,937,436 A | * | 2/1976 | Stewart ..................... 248/499 |
| 3,937,437 A | * | 2/1976 | Stewart ..................... 248/499 |
| 4,227,633 A | * | 10/1980 | Sellberg .................. 224/42.28 |
| 4,248,558 A | * | 2/1981 | Lechner .................... 410/104 |
| 4,650,382 A | | 3/1987 | Johnson |
| 4,936,724 A | | 6/1990 | Dutton |
| 4,954,031 A | | 9/1990 | Geeck, III |
| 5,037,019 A | * | 8/1991 | Sokn ........................ 224/558 |
| 5,302,064 A | | 4/1994 | Davis |
| 5,533,848 A | | 7/1996 | Davis |
| 5,560,526 A | | 10/1996 | Jantzen et al. |
| 5,560,576 A | * | 10/1996 | Cargill .................. 248/231.61 |
| 5,984,339 A | | 11/1999 | Guild |
| 6,026,545 A | | 2/2000 | Duggan |
| 6,039,520 A | * | 3/2000 | Cheng ....................... 410/106 |
| 6,113,328 A | | 9/2000 | Claucherty |
| 6,179,181 B1 | | 1/2001 | Johnson et al. |
| 6,270,301 B1 | | 8/2001 | Dunlop |
| 6,331,094 B1 | | 12/2001 | Burrows |
| 6,350,089 B1 | | 2/2002 | Tekavec |
| 6,354,777 B1 | | 3/2002 | Riekki |
| D468,192 S | | 1/2003 | Lee |
| 6,524,056 B1 | | 2/2003 | Kloster |
| 6,530,730 B2 | | 3/2003 | Swensen |
| 2003/0049090 A1 | * | 3/2003 | Condon ....................... 410/96 |
| 2004/0028497 A1 | * | 2/2004 | Wheatley ................... 410/115 |

* cited by examiner

*Primary Examiner*—D. Glenn Dayoan
*Assistant Examiner*—H. Gutman
(74) *Attorney, Agent, or Firm*—Michael F. Hughes; Hughes Law Firm, PLLC

(57) ABSTRACT

A bracketing member adapted to mount a motorcycle to the upper forward region of the bed of a pickup truck with mounting straps. The bracketing member having an elongate member adapted to extending in the lateral direction and having a mounting region and an attachment region that are not coplanar to provide rigidity. The plane that the attachment region is positioned in a substantially in line with the direction of pull of the mounting straps.

22 Claims, 6 Drawing Sheets

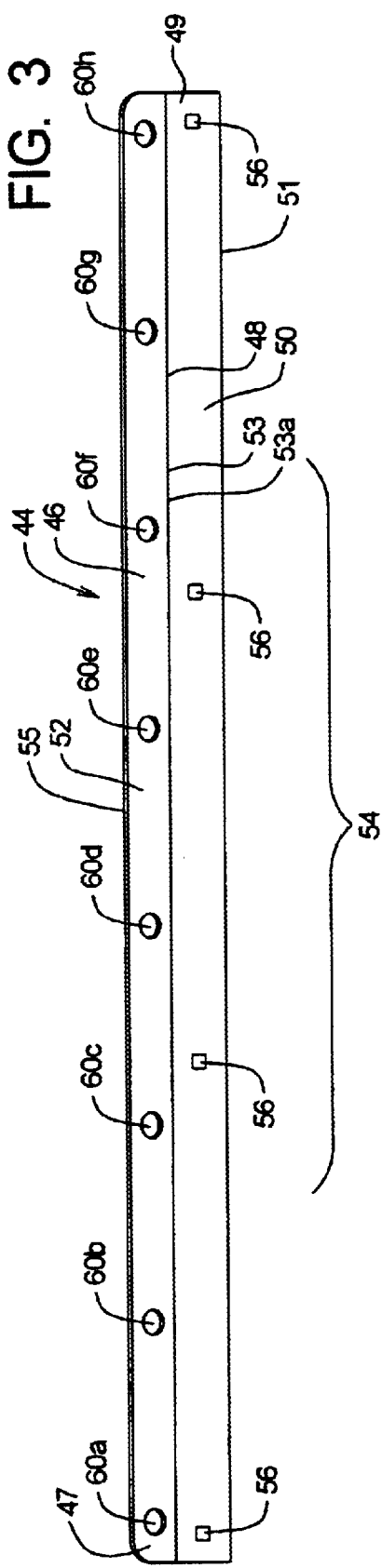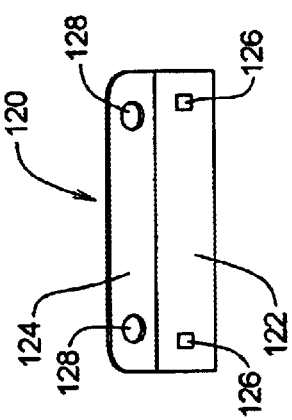

TIE DOWN BAR

RELATED APPLICATIONS

This application claims priority benefit of U.S. Ser. No. 60/444,160, filed Feb. 3, 2003.

BACKGROUND OF THE INVENTION a) Field of the Invention

The invention relates to a tie down bar, particularly a bar that is adapted to be retrofitted to pickup trucks. It is common practice to mount motorcycles or the like to the bed region of a pickup truck. Oftentimes, pluralities of motorcycles are desired to be attached to a pickup truck and there are limited fixing points to attach the mounting straps to pickup. Alternately, there are no suitable mounting locations to attach the mounting straps (e.g. tie downs). An additional problem associated with mounting a motorcycle to the bed region of a pickup truck is oftentimes a substantial amount of force is exerted upon the mounting straps where the front shock of the motorcycle is compressed and the mounting straps have a relatively high amount of tension exerted thereon. This tension is transferred to the mounting point of the pickup truck which oftentimes is a single point load. Further, an opposite longitudinally forward force is exerted by the tire to the front region of the pickup truck.

b) Background Art

In the operating environment, when the rider of the motorcycle places riding the motorbike up a ramp. The ramp is positioned at the tailgate region of the pickup. Riding up a ramp requires a fair degree of skill depending upon the height of the pickup truck and length of the ramp, but oftentimes this can be a difficult task, particularly for inexperienced rider. To ride the motorcycle up the ramp, a certain amount of velocity is required and oftentimes the rider must accelerate up the ramp to ensure that he makes it to the top. This is particularly dangerous because oftentimes the ramp has insufficient lateral width and if the rider were to stop halfway up there is no suitable area in the lateral direction to support the rider. Therefore the rider must rely on the gyroscopic procession of the tires to keep him upright as he rides onto the bed region. Oftentimes, the rider uses excessive speed and occasionally does not transition to break after reaching the top of the ramp. This causes an impact by the tire to the front region of the pickup truck.

The front wall of a pickup truck is commonly made from a relatively thin metallic material. Oftentimes, an impact from the front tire of a motorcycle may cause a dent in the front region of the truck bed depreciating the truck's value. It is therefore desirable to prevent this impact from causing damage to the upper front region of the truck bed.

The prior art shows various methods for retrofitting rails or the like to handle payload. The U.S. Pat. No. 5,533,848 shows a pay load anchoring device where hook members are adapted to position slot plates to a mounting track. The slot plates are repositionable when the hook members are removed therefrom. The U.S. Pat. No. 4,650,382 shows a tie down rail for a truck bed that is adapted to be mounted to the lateral regions of the truck bed. Another U.S. Pat. No. 4,954,031 shows a tie rail construction having a linear upper portion and a linear lower portion at an angle where the underside of the linear upper portion is adapted to mount to the upper surface of a pickup truck or the like. The U.S. Pat. No. 4,936,724 shows a truck box top molding where slotted rails are mounted to the top portions of the pickup truck bed.

Other applications such as U.S. Pat. No. 6,270,301 shows a tie down rail that is adapted to be attached to the lateral regions of the truck. U.S. Pat. No. 6,350,089 shows a portable pickup truck tie down apparatus that mounts to a perimeter region of a pickup using a clamping mechanism. The U.S. Pat. No. 6,530,730 patent shows an article anchoring device for mounting articles to an article receiving tray. The U.S. Pat. No. 5,302,064 patent discloses a cargo tie down that permanently installs to the bed of the cargo area of the pickup truck or trailer.

The following prior art disclosures show various methods for mounting a motorcycle to the bed of a pickup truck or the like. U.S. Pat. No. 6,524,056 shows a motorcycle loading and storage apparatus where a rail structure is employed to mount the tire thereto. The U.S. Pat. No. 6,354,777 shows a harness for motorcycle loading and mounting thereto. Another application, U.S. Pat. No. 6,331,094 shows a wheel lock system for mounting a motorcycle thereto. The U.S. Pat. No. 6,179,181 shows a bike transport rack with stabilizer arms that extend rearward in the longitudinal direction to affix a bike thereto. The application 5,984,339 shows a motorcycle towing apparatus were the front wheel is locked to a securing device which wraps around the lateral portions of the wheel. Further, the disclosure and U.S. Pat. No. 5,560,526 shows a cycle and bike rack where channels are employed wrapping around the lateral portions of the wheels of the bike or cycle. On a similar note, the disclosure and 3,912,139 upstanding sidewalls help secure a cycle thereto. Finally, U.S. Pat. No. 3,785,517 shows a motorcycle carrier and chock showing a pivoting wheel sheath like channels that wraps around the lateral portions of a wheel of the front tire.

The following prior art disclosures show various tie downs formed by two or more separate members. The disclosure and U.S. Pat. No. 6,113,328 shows a tie down device where the various tie down devices are separately attached to the bed region of a truck. Further, the disclosure and 6,026,545 shows a restraint dip fitting that is adapted to have more than one fitting mount various locations to secure cargo.

The design patent 468,192 shows a rope or cable hook adapted to be mounted to trailers and trucks.

SUMMARY OF THE INVENTION

A bracketing member for use with mounting straps is adapted to be mounted to the upper forward region that is substantially vertical of the bed of a truck. The truck has a longitudinal and lateral axis and adapted to mount a motorcycle having a front tire thereto. The bracketing member comprises elongate member adapted to substantially extend in the lateral direction having a central region. The elongate member comprises a mounting region substantially extending in the lateral direction and substantially planar in a mounting plane and having a plurality of mounting points that comprise surfaces to define openings. The mounting region is adapted to be mounted to said upper forward region of the bed of a truck. The elongate member further comprises an attachment region extending in an attachment plane that is non-coplanar to the mounting region so as to provide rigidity. The attachment region has a plurality of positionally fixed attachment points that define openings that are no larger than 3 inches in any direction. The attachment points are adapted to connect to the mounting straps and the attachment plane is adapted to be within 25 degrees of the direction of pull of the mounting straps. A plurality of fasteners having a head region, a base region and a linking member are used where the fasteners are adapted to mount the elongate member removably and mechanically to the upper forward region of the truck bed at the mounting points of the elongate member. The mounting region is adapted to distribute the load exerted upon the elongate member for a substantially more uniform load distribution along the said upper forward region of the bed of a truck.

BRIEF DESCRIPTION OF THE DRAWINGS

FIG. 3 is a front view of the elongate member;

FIG. 4 shows another embodiment of an attachment member;

DETAILED DESCRIPTION OF THE PREFERRED EMBODIMENTS

Figure 1:
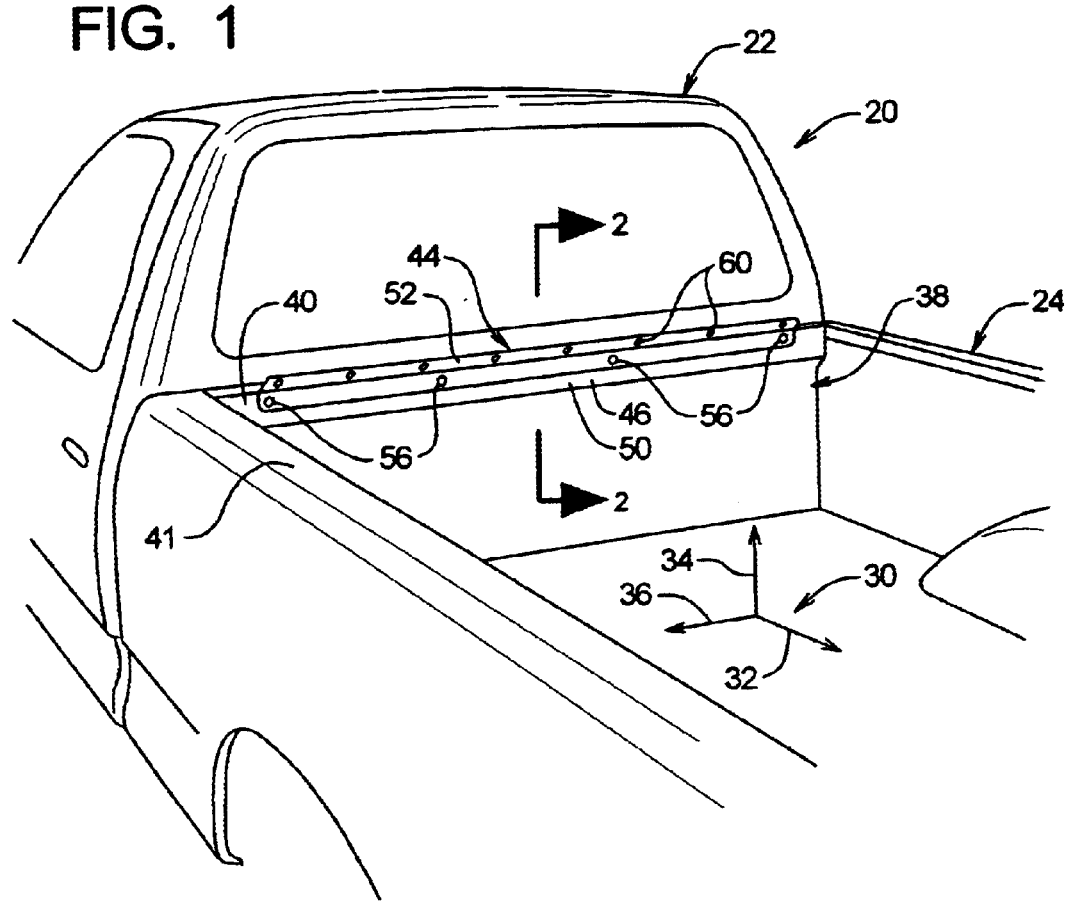
FIG. 1 is an isometric environmental view of the bracketing member attached to the upper forward region of the bed of a pickup truck.
Figure 2:
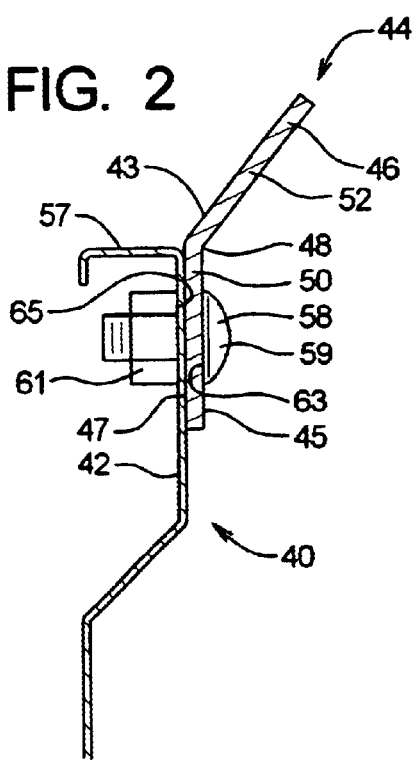
FIG. 2 shows a cross sectional view taken at line 2—2 in FIG. 1 showing the elongate member being attached to the substantially vertical portion of the upper front region of the bed of the pickup truck where a fastener attaches the elongate member thereto.

There will now be a discussion of the present invention with initial reference to FIG. 1. As shown in this figure, the general environment is a truck 20 having a cab region 22 and a bed region 24. To assist the description of the invention an axis system 30 is defined to indicate general directions. The axis 32 indicates a longitudinal direction. The axis 34 indicates a vertical direction and the axis 36 indicates a lateral direction. The directions are not intended to limit the invention to any specific orientation other than the limitations set out in the claims. The bed region 24 of the truck 20 has a forward region 38 and located in the forward region is an upper region indicated at 40. As shown in FIG. 2, the upper forward region 40 of the truck bed 24 generally has a relatively thin side profile made usually from a metallic material indicated at 42 and is commonly formed by a stamping or bending process described further herein. Normally, the rigidity of the upper forward region 40 along the lateral axis 36 is not sufficient to withstand various impacts and pressures applied thereto. The environment further comprises an upper surface truck bed plane 41 that is defined as the approximate location of the perimeter surface of the truck bed that is commonly adapted to support a canopy. As shown in FIG. 2, the upper surface 57 is a part of the upper surface truck bed plane.

Now referring back to FIG. 1, the bracketing member 44 is shown mounted to the upper forward region 40 of the truck bed 24. As shown in FIG. 3, the bracketing member 44 comprises an elongate member 46. The elongate member 46 has a first lateral end 47 and a second lateral end 49. In one form the elongate member 46 is a unitary member made from a single piece of material. One method of manufacturing the elongate member 46 is to bend the elongate member 46 about a laterally extending crease indicated at 48. The elongate member comprises a mounting region 50 and an attachment region 52.

Referring back to FIG. 2, the mounting region 50 substantially extends in a mounting plane defined by the lateral axis 36 and vertical axis 34 (see FIG. 1) and the attachment region 52 extends an attachment plane substantially in the lateral direction 36; however, the attachment plane is not coplanar with the mounting plane and they intersect approximately near the crease 48 as shown in FIG. 3. The elongate member 46 has a central region generally indicated that is adapted to engage a tire of a motorcycle as described below. The elongate member further has a rearward surface 45 and a forward surface 43.

The mounting region 50 is substantially positioned in a mounting plane and comprises a plurality of mounting points 56. Each mounting point 56 comprises a surface that defines an opening. As shown in FIG. 2, a fastener 58 is adapted to extend through the opening of each mounting point and mount the elongate member 46 to the upper forward region 40 of the truck bed 24. In one form, the fasteners 58 are bolt and nut assembly having a bolt 59 and a nut 61 where the mounting points 56 correspond in location to holes of the upper forward region 40. In one form, the nut 61 is a Nylock Nut having a material other than the threaded portion that frictionally engages the threads of the bolt 59 so the bolt remains intact. In one method of attachment, holes can be drilled in the upper forward region 40 of the truck bed 24. One method of aligning the holes is to clamp the elongate member 46 to the desired location on the upper forward region 40 of the truck bed 24 and simply drill through the truck bed material 42. Thereafter the fasteners 58 can extend through the surfaces defining the holes of the mounting region 50 and the upper forward region 40 and subsequently, the elongate member 46 can be attached thereto. Therefore, the bracketing member 44 is defined as comprising the assembly of the elongate member 46 and the fasteners 58.

The lower portion of the forward surface 43 as shown in FIG. 2, is adapted to engage the upper forward region 40 that is substantially vertical of the pickup truck bed 24.

The fasteners are broadly defined where the head portion of the bolt 59 is one form of a portion of a fastener and has a head region with an engagement surface 63 adapted to engage the rearward surface 45 of the mounting region 50. In a likewise matter, the fasteners 58 heavy bass region which in one form is a nut 61 and has a rearward surface 65 adapted to engage the forward surface of the material 42 which is located at the substantially vertical upper forward region 40 of the bed 24 of the pickup truck 20. The fasteners 58 further comprise a leaky member which in one form is a portion of the bolt 59 that is adapted to be in tension and connects the bass region in the head region of the fasteners 58 and provides a connection with sufficient attention to mount the elongate member 46 to the substantially vertical upper forward region 40 of the pickup bed 24. Of course other forms of fasteners can be employed such as rivets, a modified type of clamp or any foreseeable type of fastener having a broadly defined head region, a bass region and a leaky member.

Figure 5:
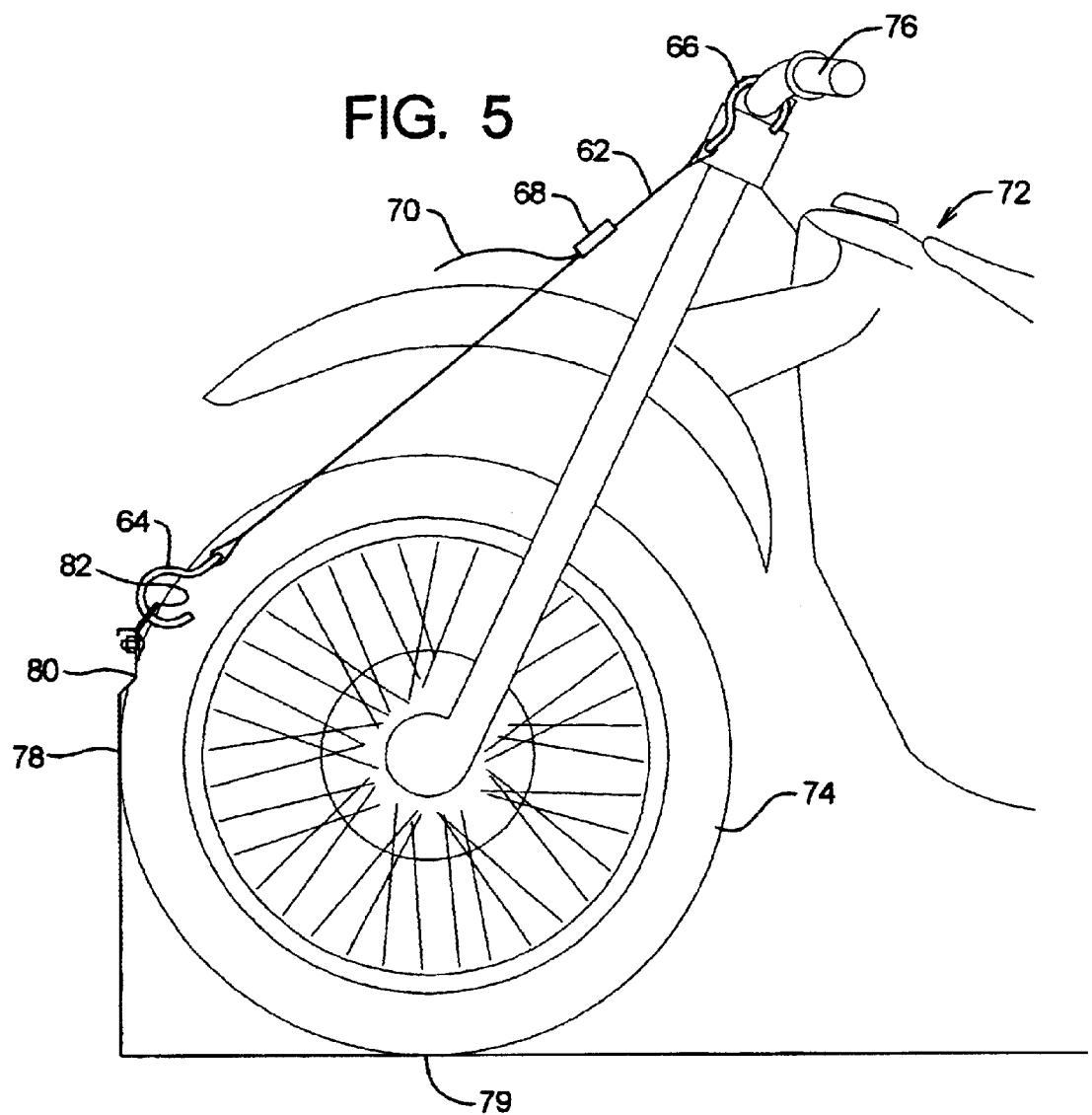
FIG. 5 shows a side view of a motorcycle mounted to the bed of a pickup truck.

Now referring to FIG. 3, the attachment region 52 is substantially positioned in an attachment plane that is not parallel with the mounting plane of the mounting region 50. The attachment region 52 comprises a plurality of attachment points 60a–60h. Of course any number of attachment points 60 can be provided along the attachment region 52. The attachment points 60 collectively are referred to by numeral 60. The attachment points 60 are adapted to connect to mounting straps 62 that are shown in FIG. 5. In one form, the mounting straps are tie downs that exert tension from the base hook connector 64 and the bike hook connector 66. A tightening member 68 is provided where the loose end 70 has tension applied thereto to effectively shorten the distance between the hook members 64 and 66. Of course any number of mounting straps 62 can be employed. For example, a ratcheting type strap is a common type of mounting strap or simply a rope with a proper knot arrangement can be employed.

Figure 5A:
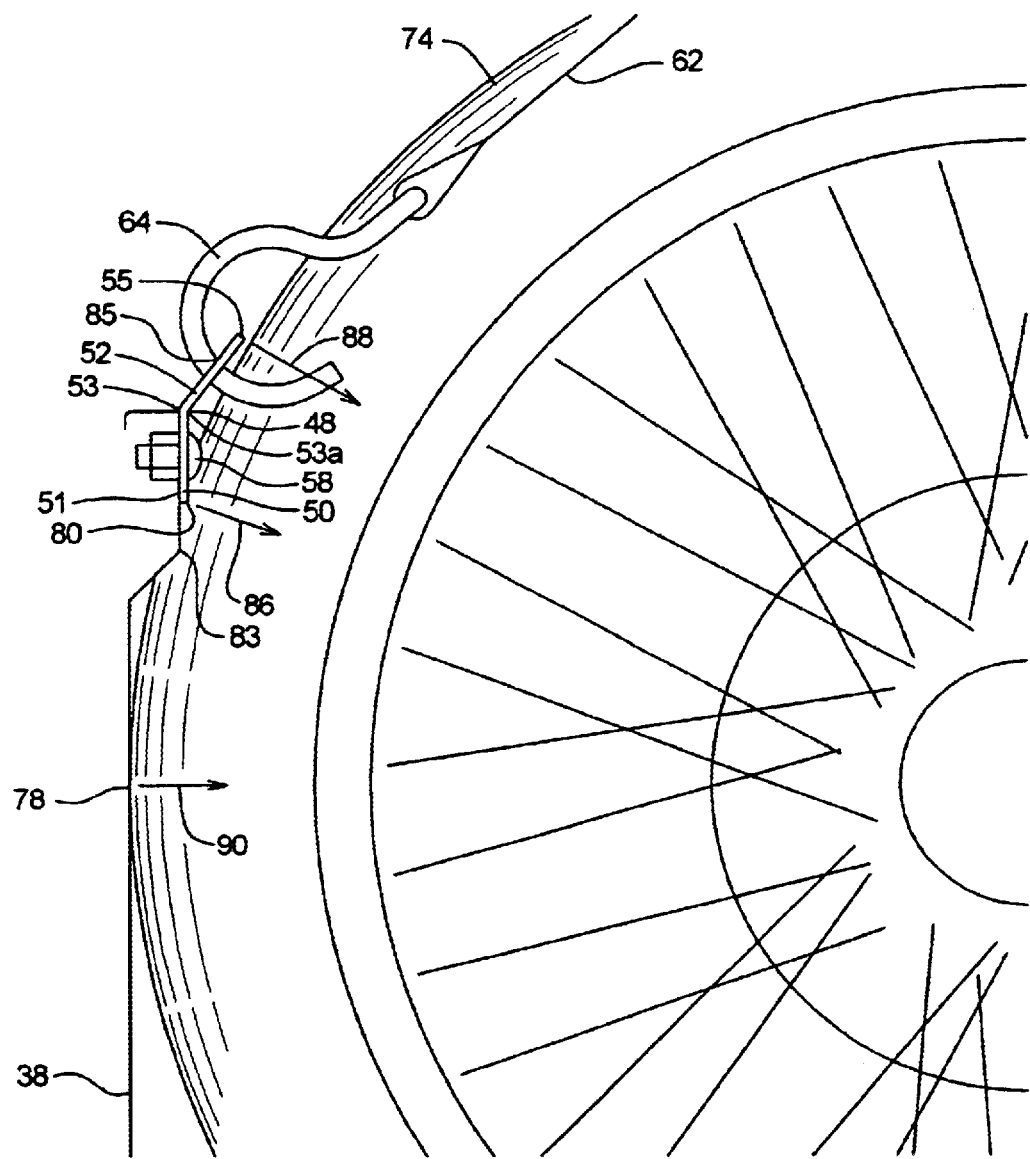
FIG. 5a shows an enlarged view of the motorcycle tire of FIG. 5.

In one form the attachment points 60 are circular. It is advantageous to have circular attachment points so the load of the straps are properly disbursed at the engagement point 85 as shown in FIG. 5a. The attachment points 60 should be of no more than 3 inches of an opening in any direction in the plane which the opening lies in. An elongate opening is not desired because an elongate opening extending in the lateral direction can bend outwardly in the direction of pull. Therefore, the broader range of openings is between ⅜ inches to 3 inches diameter in any direction and a narrow range is between ⅝ of an inch to 1.5 inches. Further, a range between ⅞ of an inch and 1⅜ of an inch is found to be a diamertical opening size that is sufficiently large enough to attached to base attachment hook 64 as shown in FIG. 5a.

Figure 6:
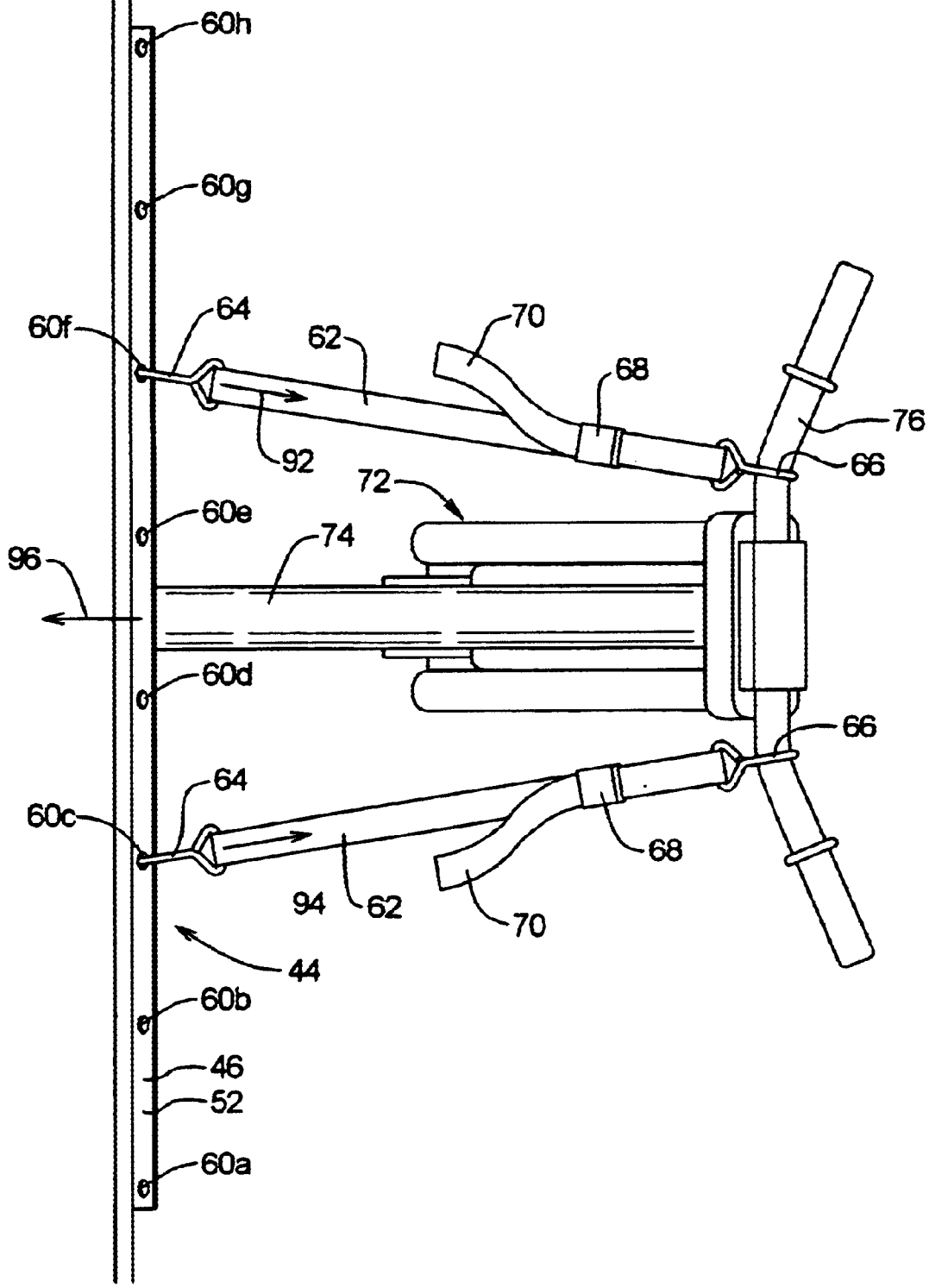
FIG. 6 shows a top view where a motorcycle is schematically shown and mounting straps attach the motorcycle to the front region of the truck.

There will now be further discussion of the general environment of operation of the bracketing member 44 with reference to FIGS. 5 and 6. As shown in these figures, a motorcycle 72 is schematically shown. For purposes of this description and claim interpretation, a motorcycle is defined broadly as a load with a suspension type travel. Therefore for example, motorcycle is hereby expressly defined to cover all-terrain vehicles such as four wheelers and other front suspension devices. The motorcycle 72 comprises a front tire 74 and a handlebar region 76. As shown in FIG. 5, the front tire has a longitudinal further most point 78, a first engagement point 80, and a second engagement point 82. Referring to FIG. 5a, it can be seen that a first force vector 86 exerts a force upon the tire 74. Further, a second force vector exerts a second force upon the tire 74 at the second engagement point 82. In some installations, the engagement point indicated at 83 will supply a reactionary force similar to that of 86. Further, depending upon the installation, a truck bed force vector indicated at 90 may be present where the furthest most point 78 is in contact with the forward region 38 of the truck bed.

As shown in FIG. 5a, in one installation the second engagement point 82 engages the tire 74 of the motorcycle. This engagement is advantageous to supply a force that has both a downward component and a rearward component. This installation providing a downward force component assists in locking the front tire to the forward region 38 of the pickup truck 20. As shown in FIG. 5, normally a frictional force at points 78 and 79 are the only engagement friction points that react to the normal forces applied thereto. The engagement point 82 provides an additional normal force having an additional frictional component. This is advantageous because the lateral motion of the tire along the lateral axis 36 is further suspended particularly because the engagement point is vertically positioned higher than the point 78 whereby providing greater leverage upon the motorcycle 72 from tipping sideways. It should further be noted that the attachment region 52 is positioned above the mounting region 50. This provides the attachment points 60 to be positioned at a higher vertical location. Because the mounting strap 62 supplies a tension force in most all situations, the mounting straps 62 have a forward and downward force component. By positioning the attachment points 60 at a higher vertical location to engage the base hook connector 64, there is an additional forward force component in the longitudinal direction. This is advantageous because the fictional force of the tire 74 at points 79 already has the weight of the motorcycle applied thereto. The frictional force at the forward point regions (a combination of the contact points 82, 80, 83 and 78 are only supplied statically by the mounting strap 62. Therefore, by having the attachment points 60 at a vertically higher position and providing an additional forward pull upon the motorcycle 72, additional friction is applied at the forward point regions. As mentioned above, this is advantageous because the lateral friction forces upon the bike will be greater due to the greater normal force and the lateral friction forces assist in stabilizing the front tire 74.

As shown in FIG. 6, the base hook connectors 64 are mounted to attachment points 60c and 60f. The force exerted upon the elongate member 46 is generally indicated by the force vectors 92 and 94. The force vectors 92 and 94 cause a forward force roughly indicated at 96. The general area of applied force is referred to as a tire engagement region. If two or more motorcycles or similar type objects are mounted to the bracketing member 44, then there will be more than one tire engagement region.

By having the attachment region 52 positioned in a plane that is substantially in-line with the pull of the mounting strap 62, there is less of a moment about the crease 48 (see FIG. 5a). In other words, if the elongate member cross-sectionally shown in FIG. 5a were turned 180° about a vertical axis, the contact point indicated at 85 would be to the upper left region providing a greater moment arm and a torque about the crease 48. This would translate to an awkward moment that is translated to the upper forward region 40 of the pickup truck bed 24. In one form, the pull of the strap 62 is between 25° in either direction of the plane of the attachment region 52. In other forms, the pull of the mounting strap 62 is between 15° or 10° of the plane of the attachment region 52. It should be noted that as shown in FIGS. 5 and 5a, the moment arm is less upon the crease 48 and is less of a moment arm and hence puts less of a stress thereto.

As shown in FIG. 5a the mounting region 50 comprises a lower longitudinally extended region 51 and an up longitudinally extended region 53. Further, the attachment region 52 comprises a lower longitudinally extended region 53a and upper longitudinally extended region 55. The mounting points 56 that are shown in FIG. 3, are positioned vertically in between the longitudinally extended regions 51 and 53. Further, the longitudinally extending regions 53 and 53a coincide in location and the mounting points 56 are positioned in-between the laterally extending regions 53a and 55. In one form, the attachment region 52 is positioned substantially in the attachment plane that is approximately 35° with respects to the mounting plane of the mounting region 50. In a broader scope, the range of the attached in plane and mounting region plane can be between 20° to 40° and 15° to 60°. In general if the angle is lessened, additional material will assist in providing rigidity. It should be noted that by having the mounting region 52 positioned longitudinally rearwardly and vertically, the direction of pull of the strap 62 will provide a lesser moment upon the upper forward region of the bed of the truck. As shown in FIG. 5a, if the moment arm is referenced from the fulcrum at the longitudinally extended region 51, by having the contact point 85 positioned rearwardly and vertically, the force exerted thereon is closer to the longitudinally extended region 51. In other words, the perpendicular distance from the direction of pull to the longitudinally extended region 51 is lower when the mounting region 52 extends upwardly and rearwardly whereby creating a smaller moment arm.

Figure 7:
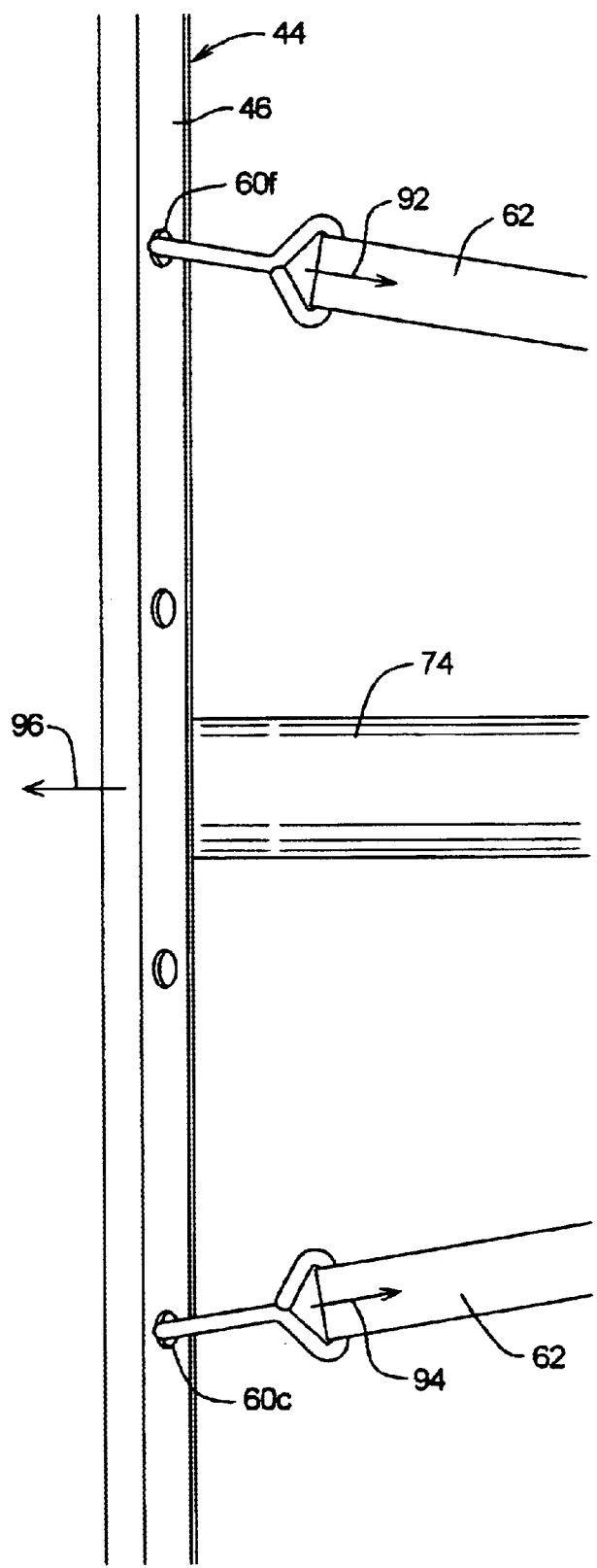
FIG. 7 is a close up view of the force factors applied to the elongate member and the forward region of the bed of the truck.
Figure 8:
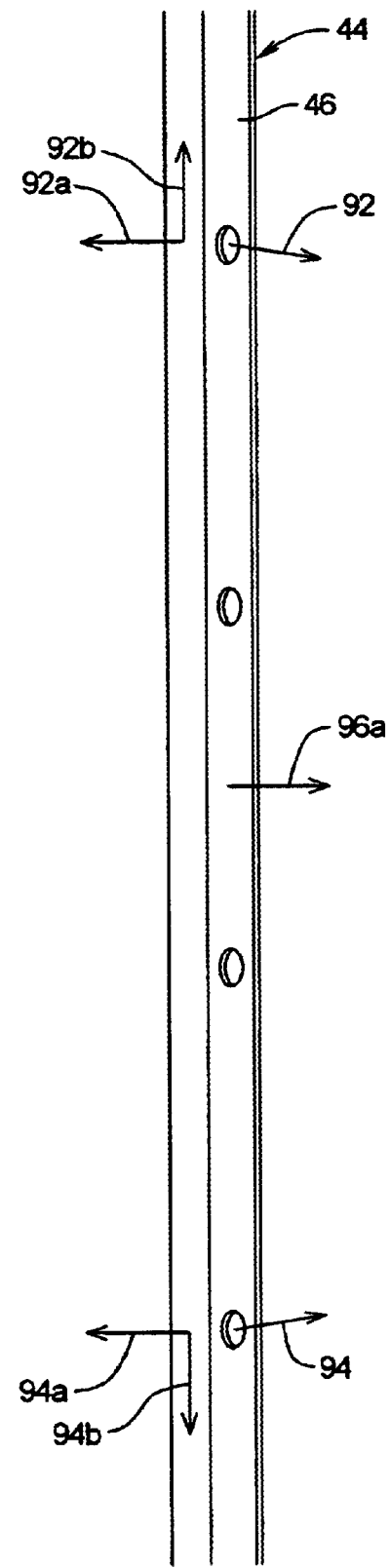
FIG. 8 shows only the force factors and reactionary forces acting upon the elongate member.

As shown in FIGS. 7 and 8, the force vectors 92 and 94 are shown exerting a force upon the attachment points 60c and 60f the forward force 96 is exerted upon the bracketing member 44 to the extent it is in contact with the front tire 74 as shown in FIG. 5 and FIG. 5a. As shown in FIG. 8, the reactive forces 92a and 94a as well as force vector 96a are shown which the elongate member 46 internally handles these forces without exerting a substantial amount of force upon the upper forward region of the truck bed which the elongate member 46 is attached thereto. It should be noted that generally the force vectors 92 have a laterally inward angle to them. Therefore lateral forces 92b and 94b are present counteracting a compression force exerted by the mounting straps 62. Further, in some installations, as shown in FIG. 5a, a portion of the front tire 74 may come in contact with the front wall of the truck bed 38 and a counter force vector 90 will be exerted upon the tire 74. This will create an additional force component upon the truck bed in the longitudinal forward direction. Because the mounting points 56 as shown in FIG. 1 are positioned at spaced intervals along the lateral axis in the mounting region 50, any excess pull that is exerted by the mounting straps 62 the resulting load will be distributed upon the mounting points 56. Further, if the tire 74 is fully engaged upon the elongate member 46 (i.e. not in direct contact with any portion of the truck bed) there can be deflection in the elongate member 46. In other words, the lateral ends 47 and 49 of the elongate member 46 will bend slightly rearwardly. However, the distributed load is exerted upon the upper forward region 40 of the truck bed 24 because the plurality of mounting points 66 will disburse the load more evenly as opposed to a single point load if the hook members 64 of the mounting straps 62 are directly connected to the truck bed.

In a similar manner, the impact point between the tire 74 and the elongate member 46 at the tire engagement region will have less of the tenancy to bend or otherwise damage the upper front region 40 of the truck bed 24 (see FIG. 1). The elongate member 46 will distribute the load laterally when a dynamic impact of the tire 74 strikes the upper forward region of the truck bed when, for example, a rider has written the motorcycle 72 up from a ramp onto the truck bed region 24 and impacts the forward region 38 of the truck bed. This is a common occurrence because riding a motorcycle onto the truck bed is generally a skilled task where a certain amount of velocity is required of the motorcycle and rider to go up a ramp. Occasionally, the rider will not sufficiently decelerate the motorcycle and the front tire 72 will impact the forward region 38 of the truck bed 24.

It should be noted that the reactive forces schematically shown in FIG. 5a, may differ based upon the environment. For example, a smaller diameter tire or a vertically high truck bed front wall would have a greater force upon the furthest most point 82. Conversely, a large tire or a shorter truck bed wall would create greater forces upon the engagement points 80 and 82. However, the bracketing member 44 will supply extra rigidity to the front wall of the pickup truck bed. Therefore, as shown in FIG. 5a, if a predominant force is exerted at the engagement point 83 which is a portion of the pickup truck bed, the bracketing member 44 will provide rigidity to the vulnerable upper forward region of the pickup bed and assist in preventing an indentation thereon. The angle of the mounting strap with respect to the horizon is found to be generally around 45°. However, the general range of the angle is substantially between 35° to 55°. In more extreme cases of course the mounting straps would vary depending upon the particular installation and type of bike. By having the mounting straps at between 35° to 55° from the horizontal plane the friction upon the front tire can be increased significantly where the frictional force in the longitudinal direction is at least 25% of the frictional force in the vertical direction on the front tire. It should be noted that the weight of the motorcycle already provides a significant normal force Now referring back to FIG. 4, another embodiment is shown where a member 120 has a mounting region 122 and an attachment region 124. Mounting points 126 are provided and function in a similar manner as mounting points 56 described above. Further, attachment points 128 are provided in the attachment region 124 and operate in a similar manner as attachment points 60 above. The member 120 can be employed where additional mounting structures are desired to be attached to the truck 20 (see FIG. 1).

It should be noted that the motorcycle is a dynamic suspension and the length of travel of the front fork can be between 8 to 16 inches. A normal range of motion of the front fork is about 12 inches. The front shocks are a spring where the force to compress increases with respect to the downward displacement of the frame of the bike. It is common to compress the front fork of the motorcycle to about 50% of the maximum travel when mounting the motorcycle to the pickup bed of a truck.

By having a plurality of attachment points 60, more than one motorcycle 72 can be attached to the bracketing member 44. Further, in one form an additional motorcycle can be attached to the bracketing member 44 and positioned in the bed region 24 of the pickup truck by employing a block-like structure which repositions the front wheel longitudinally rearwardly with respect to the other motorcycle or motorcycles. This is advantageous where the handlebars of the motorcycles may interfere spatially and overlap. A block like structure will engage the front tire and reposition a motorcycle in the rearward direction thereby allowing the handlebars to freely clear the adjacent motorcycle or motorcycles. It should be noted that the attachment points 60 for each motorcycle can overlap where the straps will cross one another.

The weight of the bracketing member 44 is relatively light and by having the mounting region 50 and the attachment region 52 substantially not coplanar and intersect along the crease 48 provides a greater moment of inertia about vertical and longitudinal axes and hence is stronger and more rigid in the longitudinal direction.

The method of making the elongate member is to retrieve an elongated piece of material. In one form, the material is Aluminum or other ductile material. Thereafter the mounting points 56 and attachment points 60 are created by creating the holes that function as the mounting points 56 and the connection points 60. Thereafter, the mounting region 50 and attachment region 52 are defined by bending the elongate member 46 along the crease. The member can be polished or other surface finish to present an atheistically pleasing attachment to the pick up truck 20.

The installment of the elongate member 46 is relatively simple where in one form, the member is temporarily attached to the upper forward region 40 of the bed of a pickup truck 20 along the substantially vertical surface. The temporary attachment of the elongate member 46 can be accomplished by clamps or simply holding the elongate member 46 in place. Thereafter, a punch or other marking device can indicate locations that correspond to the location of the mounting points 56. Thereafter, holes can be drilled in the upper forward region 40 of the bed 24 of the pickup truck 20 that are of a sufficient diameter to allow the base hook connector 64 to attach thereto (see FIG. 5a).

It should be noted that the shown embodiments do not have loose attachments that can rattle or vibrate and create noise during operation of the pickup truck 20 or other attached vehicle. In one form the elongate member 46 is a unitary design and the fasteners 58 are securely attached to the elongate member 46 in the upper front region 40 of the pickup truck 20 whereby they remain static through vibrations and do not create noise or other byproducts from vibrations. It should further be noted that the fasteners 58 are removably and mechanically attached to the upper forward region 40 of the bed 24 of the truck 20 as shown best in FIG. 2. This is advantageous where the owner of the truck 20 decides to remove the bracketing member 44 for any reason such as transferring title of the vehicle to another owner who would not utilize the bracketing member 44. By attaching the bracketing member 44 to the substantially vertical upper forward region 40 of the bed 24 of the pickup truck 20 as shown in FIG. 1, the upper surface of the forward region which is generally regarded as the exterior surface portion of the vehicle is not marred or scratched. Further, as shown in FIG. 2, the upper surface 57 is generally narrower and occasionally does not provide adequate upper surface area to properly mount a structure like the elongate member 46. As shown in FIG. 2, the upper surface 57 is a part of the upper surface truck bed plane (see FIG. 1) and the elongate member 46 does not extend above this plane. This is advantageous because the elongate member 46 in the attached position as shown in FIG. 2 would not impede inserting a canopy around the upper perimeter region horizontal surface of the truck bed.

It can therefore be appreciated that the embodiments shown above can be practiced in combination or in an isolated manner where the metes and bounds of the invention are defined in the claims below and the full scope of the invention is to be interpreted by the claims in their broadest meaning.

I claim:

1. A bracketing member for use with mounting straps and adapted to be mounted to the upper forward region that is substantially vertical of the bed of a truck having a longitudinal and lateral axis and adapted to mount a motorcycle having a front tire thereto, the bracketing member comprising:
   an elongate member adapted to substantially extend in the lateral direction having a central region, the elongate member comprising:
   i a mounting region substantially extending in the lateral direction and substantially planar in a mounting plane and having a plurality of mounting points that comprise surfaces to define openings, the mounting region is adapted to be mounted to said upper forward region of the bed of the truck,
   ii an attachment region extending in an attachment plane that is noncoplanar to the mounting region to provide rigidity, the attachment region having a plurality of positionally fixed attachment points that define openings that are no larger than 3 inches opening in any direction, the attachment points being adapted to connect to said mounting straps and the attachment plane is adapted to be within 25 degrees of the direction of pull of the mounting straps,
   iii a tire engagement region adapted to engage said front tire of the motorcycle,
   a plurality of fasteners having a head region, a base region and a linking member where the fasteners are adapted to mount the elongate member to the upper forward region of the truck bed at said mounting points of the elongate member,
   whereas the mounting region is adapted to distribute the load exerted upon the elongate member for a substantially more uniform distribution along, the upper forward region of the bed of the truck and a portion of the mounting region and attachment region located in the tire engagement region are adapted to engage said front tire of the motorcycle and apply pressure thereto.

2. The bracketing member as recited in claim 1 where the attachment region comprises a plurality of circular holes to operate as the attachment points.

3. The bracketing member as recited in claim 1 where the position of the attachment points is of a sufficient height to have the mounting straps be positioned at an angle of at least 350 from a level plane.

4. The bracketing member as recited in claim 3 where a frictional force in the longitudinal direction on the front tire is at least 25% of a frictional force in the vertical direction on the front tire.

5. The bracketing member as recited in claim 1 where the mounting points are positioned vertically above the attachment points.

6. The bracketing member as recited in claim 1 where the elongate member is adapted to mount two motor cycles thereto.

7. The bracketing member as recited in claim 5 where the attachment region is adapted to engage the front tire and provide a downward force to hold the front tire in place.

8. The bracketing member as recited in claim 1 where the fasteners are a bolt and nut assembly and the bolts are adapted to extend through the mounting points and are adapted to fix the bracketing member to the upper forward region of the bed of the truck.

9. The bracketing member as recited in claim 1 where the attachment plane is between 20–40 degrees with respects to the mounting plane.

10. The bracketing member as described in claim 9 where the elongate member is of a unitary structure.

11. The bracketing member as described in claim 9 positioned substantially in the attachment plane that is substantially between 20° to 40° with respects to the mounting plane of the mounting region.

12. The bracketing member as described in claim 1 where the plurality of positionally fixed attachment points that define the openings are no larger than 1.5 inches opening in any direction and the attachment plane is adapted to be within 15 degrees of the direction of pull of the mounting straps.

13. The bracketing member as described in claim 1 where the fasteners removably and mechanically attach the elongate member to the upper forward region.

14. The bracketing member as described in claim 12 where the fasteners removably and mechanically attach the elongate member to the upper forward region.

15. The bracketing member as described in claim 14 where the bed of the truck comprises an upper surface truck bed plane that is adapted to have a canopy mounted thereto whereby the bracketing member does not inhibit the attachment of the canopy.

16. A method of mounting a motorcycle to the bed of a truck having a lateral and longitudinal axis and an upper forward region, the method comprising:
   positioning an elongate member having a mounting region and an attachment region in the lateral direction and mounting the mounting region with fasteners to a substantially vertical portion of the upper forward region of the bed of the truck,
   positioning the motorcycle so a front tire of the motorcycle is engaging the forward region of the bed of the truck, retrieving mounting straps each having a bike hook connector and a base hook connector and positioning the bike hook connector to handlebars of the bike and the base hook connectors to attachment points located in the attachment region of the elongate member where the attachment points are surfaces that define openings that do not exceed 3 inches in any direction of the opening, distributing the load exerted upon a front region of the bed of the truck whereby the base hook connectors distribute the load laterally along the mounting region of the elongate member, whereas the mounting region and the attachment region are substantially positioned in planes that are not coplanar to provide rigidity and the attachment region lies in a plane that is within 20° of the line of pull of the mounting straps.

17. The bracketing member as recited in claim 16 where the attachment region comprises a plurality of circular holes to operate as the attachment points.

18. The bracketing member as recited in claim 16 where the position of the attachment points is of a sufficient heights to have the mounting straps be positioned at an angle of at least 35° from a level plane.

19. The bracketing member as recited in claim 18 where a frictional force in the longitudinal direction on the front tire is at least 25% of a frictional force in the vertical direction on the front tire.

20. The bracketing member as recited in claim 16 where mounting points are positioned vertically above the attachment points.

21. A bracketing member for use with mounting straps and adapted to be mounted to the upper forward region that is substantially vertical of the bed of a truck having a longitudinal and lateral axis and adapted to mount a motorcycle having a front tire thereto, the bracketing member comprising an elongate member adapted to substantially extend in the lateral direction having a central region, the elongate member comprising a mounting region substantially extending in the lateral direction and substantially planar in a mounting plane and having a plurality of mounting points that comprise surfaces to define openings, the mounting region is adapted to be mounted to said upper forward region of the bed of the truck, the elongate member further comprising an attachment region extending in an attachment plane that is noncoplanar to the mounting plane to provide rigidity, the attachment region having a plurality of positionally fixed attachment points that define openings that are no larger than 3 inches opening in any direction, the attachment points being adapted to connect to said mounting straps and the attachment plane is adapted to be within 25 degrees of the direction of pull of the mounting straps, a plurality of fasteners having a head region, a base region and a linking member where the fasteners are adapted to mount the elongate member removably and mechanically to the upper forward region of the truck bed at said mounting points of the elongate member, whereas the mounting region is adapted to distribute the load exerted upon the elongate member for a substantially more uniform distribution along the said upper forward region of the bed of a truck.

22. A bracketing member arranged to be used with mounting straps to mount a motorcycle on a bed of a truck, the bed having a horizontal upper support surface and a front panel that is substantially vertically aligned, said bed of the truck having a longitudinal axis and transverse axis and with the motorcycle having at least one front tire and arranged to be mounted on the bed of the truck with the front tire adjacent to the front panel of the bed of the truck, the bracketing member comprising:

an elongate member adapted to be mounted to the front panel in a manner to substantially extend in a lateral direction, the elongate member having a central region and comprising:

i a mounting region extending in the substantially lateral direction and substantially planar in a substantially vertical mounting plane and having a plurality of mounting locations which are to define openings, the mounting region being adapted to be to the upper forward region of the bed of the truck, ii an attachment region extending in an attachment plane that extends in an upward and rearward slant relative to the mounting region so as to provide rigidity, the attachment region having a plurality of positionally fixed attachment locations that define openings that are no larger than 3 inches in any direction, the attachment locations being adapted to connect mounting straps and the attachment plane being to be within 25 degrees of the direction of pull of the mounting straps, iii a tire engagement region adapted to engage said front tire of the motorcycle, whereas the attachment locations are positioned in a manner to be located in a upward and rearward position with respect to the mounting region whereby reducing the moment exerted upon the upper forward region of the bed of the truck.

* * * * *